Figure 1:
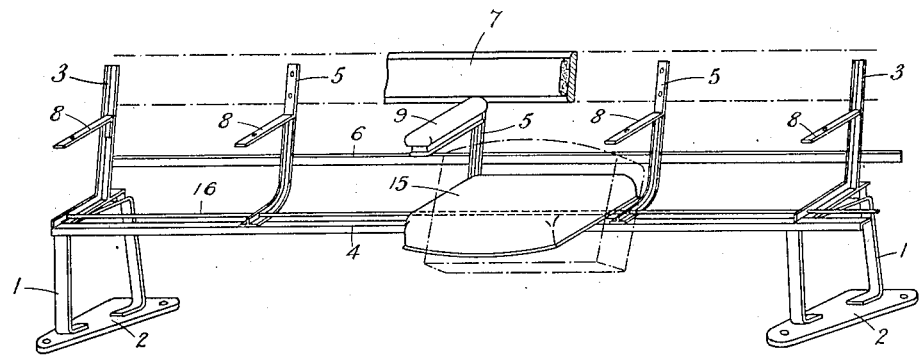

P. CORNISH.
FIXED SEAT FOR USE IN CINEMAS, THEATERS, AND THE LIKE.
APPLICATION FILED JUNE 22, 1920.

1,351,995.

Patented Sept. 7, 1920.

INVENTOR:
Philip Cornish
By Wm Wallace White
ATTY.

UNITED STATES PATENT OFFICE.

PHILIP CORNISH, OF LEYTONSTONE, ENGLAND.

FIXED SEAT FOR USE IN CINEMAS, THEATERS, AND THE LIKE.

1,351,995.     Specification of Letters Patent.     Patented Sept. 7, 1920.

Application filed June 22, 1920. Serial No. 390,956.

*To all whom it may concern:*

Be it known that I, PHILIP CORNISH, a subject of the King of Great Britain and Ireland, residing at 715A High Road, Leytonstone, in the county of Essex, England, have invented new and useful Improvements in Fixed Seats for Use in Cinemas, Theaters, and the like, of which the following is a specification.

The fixed seats, by which is meant seats secured to a floor, which are generally used in cinemas, and the same holds good as regards many of the seats used in theaters and other places where public entertainments are given, are supported by vertically disposed frames located at the end of each seat. Owing to the close proximity of said frames it is impossible to properly sweep the floor or the carpets covering same. As a consequence dirt and dust accumulate around the foot of the frames. This is not only undesirable, but objectionable from a sanitary point of view.

The main object of the present invention is to construct and arrange seats of the above referred to kind, more especially tip-up seats, in such manner as to greatly reduce the number of the vertically disposed frames which serve as supports for the seats. Further objects of the invention are to so construct the seats that the stuffed and upholstered parts thereof can be readily removed for cleaning purposes, and to provide means whereby the level of the seats may be adjusted in accordance with the rake of a floor.

In carrying out the invention vertically disposed frames of approximately U-shape and constructed from mild steel of flat or other section bent to shape are fixed, preferably through the medium of foot plates, to the floor of a cinema or the like at intervals, corresponding to a number of seats, say, four seats, and to these frames are secured vertically disposed members of approximately L-shape. Longitudinally disposed members formed of mild steel, which may be made in lengths corresponding to the distances between said end L-shaped members, are secured to the latter to serve as a means for connecting and bracing them and as supports for the back parts of the seats. To these longitudinally disposed sections are secured, in positions corresponding to the end of each separate seat, other or intermediate approximately L-shaped members, the horizontal parts of which vary in length according to whether the seats are to be tip-up seats or relatively fixed seats. Arm rests, when employed, are secured to brackets on the L-shaped members, both end and intermediate members, the wood foundations of padded arm rests being slotted or grooved and slid on to said brackets, not being, as usual, fixed to the brackets by screws only. The seats, when arranged to tip up, are either removably mounted in, or are permanently fixed to, steel frames or the like, which may or may not be provided with downwardly projecting brackets or plates formed with holes. Rods, to serve as pivotal supports for the seats and to act as ties for the lines of seating, are passed through the holes formed in said brackets or plates, or through holes formed in the seats themselves, and through holes formed in all of the L-shaped members of the seating, and are secured by nuts to the outermost L-shaped members. Adjustment of the level of the seats in accordance with the rake of a floor is effected by means of packing or distance pieces interposed between the U-shaped frames and the end vertically disposed L-shaped members, or in any other way, such as by pivoting the end L-shaped members to the U-shaped frames and securing them in adjusted position by any suitable means. The stuffed parts of the backs of the seats, when the backs are stuffed, are secured by screws and bolts and nuts to the longitudinally disposed members forming the backs of the seats. The improved seating may be provided with foot rests, while serrated or like bars may be secured to the longitudinally disposed members of the improved seating which run at the backs of the seats, in order to prevent the occupants of seats placing their feet on the seats in front of them.

The accompanying drawings illustrate a seating arrangement constructed in accordance with the invention, in which the separate seats are tip-up seats.

Figures 2, 3, 4, 5, 9:
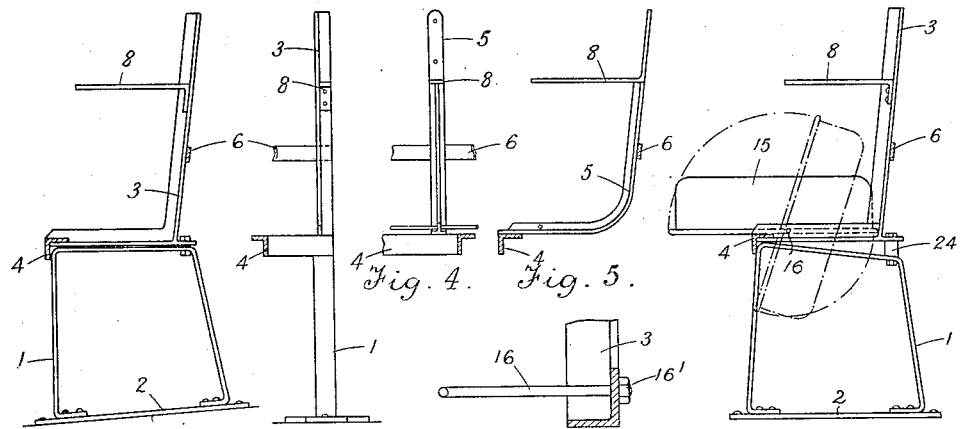
Figures 6, 7:
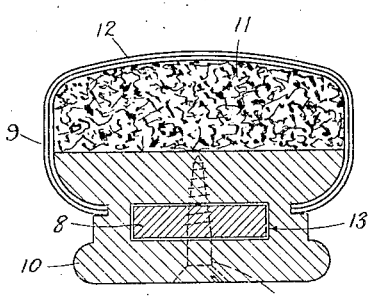
Figure 8:
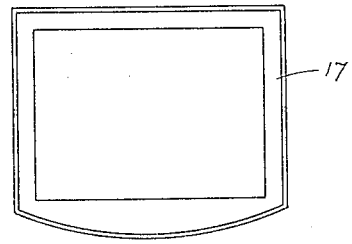

Figure 1 is a perspective view of a section or part of the improved seating, in which the tip-up seats are omitted from three of the seat spaces. Figs. 2 and 3 are respectively a transverse section and a front view illustrating one of the end vertically disposed and approximately L-shaped members of the seating arrangement. Figs. 4 and 5 are a front view and a side view of one of the intermediate vertically disposed and approximately L-shaped members of the seating arrangement. Fig. 6 is a section taken through one of the end L-shaped members and the under frame by which it is supported. Fig. 7 is a transverse section through one of the arm rests. Fig. 8 is a plan of an angle-steel frame for the tip-up seats which may be used when the seats proper are removable therefrom. Fig. 9 is a transverse section through the seating arrangement illustrating one way in which the level of the seats may be adjusted in accordance with the rake of the floor of a cinema or the like.

Referring now to these drawings, 1 are the under frames of the improved seating arrangement which are preferably fixed to the floor of the cinema or the like through the medium of footplates 2, and are located at a distance apart corresponding to a plurality of seats, four seats in the present instance. 3 are vertically disposed members of approximately L-shape which are made of mild steel of L-section, bent to shape, and are secured in any suitable manner to the under frames 1. 4 is a longitudinally disposed member, also made of L-section and of mild steel, which is secured to the front ends of the under frames 1. 5 are vertically disposed members of approximately L-shape, which are made of mild steel and T-section bent to shape and are secured at their front ends to the longitudinally disposed member 4. 6 is a flat bar secured to the rear faces of the upstanding parts of the approximately L-shaped members 3 and 5, and 7 is the back for the seats, fixed to the fronts of the members 3 and 5, the central webs of the members 5 being removed for the purpose of enabling the back to be secured to these members. 8 are brackets which are secured to the members 3 and 5, either by rivets or welding, for the purpose of supporting arm rests 9. The arm rests 9 are constructed in such manner that they may be readily slipped on to and removed from the brackets 8, and may consist of a wood base 10, an upper stuffed part 11, and a leather cover 12 for the stuffed part 11, secured at its edges to the wood base 10. These arm rests, though they may be otherwise mounted on the brackets 8, are preferably mounted on the brackets 8 in the manner shown in Fig. 7, that is the wood bases 10 are formed with slots 13 of a size corresponding to the cross-section of the brackets 8, and the arm rests are secured in position on the brackets by means of one or more screws 14 passing through one or more holes formed in the brackets. 15 are the tip-up seats, one of which is shown in Fig. 1. These seats are mounted on a rod 16 passing through the seats and the vertically disposed webs of the members 3 and 5, and are held in position by means of nuts 16¹ engaging with the ends of said rod, see Fig. 6. The tip-up seats may consist of frames 17 of angle steel bent to shape, see Fig. 8, and of seats proper secured in position therein in such manner that they may be readily removed therefrom. The seats proper may however be permanently secured in the frames that are mounted on the rod 16.

The level of the seats is adjusted according to the rake of the floor of the cinema or the like in which the seats are to be used either by making the limbs of the under frames 1 of different lengths, as shown in Fig. 2; or, as shown in Fig. 9, by interposing distance pieces 24 between the rear ends of the horizontally disposed limbs of the members 3 and the opposite parts of the under frames 1 or in any other suitable way.

The number of seats comprised in a section of the improved seating arrangement may be less than four or more than four, and any desired number of sections may be used side by side.

What I have invented and desire to secure by Letters Patent of the United States is as follows:—

1. Seating arrangement for use in a cinema consisting of under frames adapted to be secured to the floor of the cinema and located at distances apart corresponding to a plurality of seats, vertically disposed members of approximately L-shape secured to said under frames, longitudinally disposed members secured to said vertically disposed members, and vertically disposed members of approximately L-shape secured to said longitudinally disposed members intermediate between the first mentioned approximately L-shaped members in positions corresponding to the ends of the separate seats.

2. Seating arrangement for use in a cinema consisting of under frames adapted to be secured to the floor of the cinema and located at distances apart corresponding to a plurality of seats, vertically disposed members of approximately L-shape and of L-section secured to said under frames, longitudinally disposed members secured to said vertically disposed members, and vertically disposed members of approximately L-shape and of T-section secured to said longitudinally disposed members intermediate between the first mentioned approximately L-shaped members in positions corresponding to the ends of the separate seats.

3. Seating arrangement for use in a cinema consisting of under frames adapted to be secured to the floor of the cinema and located at distances apart corresponding to a plurality of seats, vertically disposed members of approximately L-shape secured to said under frames, longitudinally disposed members secured to said vertically disposed members, vertically disposed members of approximately L-shape secured to said longitudinally disposed members intermediate between the first mentioned approximately L-shaped members in positions corresponding to the ends of the separate seats, a rod passing through all of said vertically disposed and approximately L-shaped members and secured in position by means of nuts engaging with its ends, and tip-up seats revolubly mounted on said rod, the front longitudinally disposed member being adapted to support the weight of the tip-up seats and their occupants, substantially as described.

4. Seating arrangement for use in a cinema consisting of under frames adapted to be secured to the floor of the cinema and located at distances apart corresponding to a plurality of seats, vertically disposed members of approximately L-shape secured to said under frames, longitudinally disposed members secured to said vertically disposed members, vertically disposed members of approximately L-shape secured to said longitudinally disposed members intermediate between the first mentioned approximately L-shaped members in positions corresponding to the ends of the separate seats, brackets secured to said vertically disposed and approximately L-shaped members, and arm rests removably mounted on said brackets.

In testimony whereof I have signed my name to this specification.

PHILIP CORNISH.